(12) United States Patent
Zhang et al.

(10) Patent No.: US 11,578,264 B2
(45) Date of Patent: Feb. 14, 2023

(54) PHOSPHOR WHEEL WITH INORGANIC BINDER

(71) Applicant: MATERION PRECISION OPTICS (SHANGHAI) LIMITED, Shanghai (CN)

(72) Inventors: Wenbo Zhang, Shanghai (CN); Ying Xu, Shanghai (CN); Michael Newell, Groton, MA (US)

(73) Assignee: MATERION PRECISION OPTICS (SHANGHAI) LIMITED, Shanghai (CN)

( * ) Notice: Subject to any disclaimer, the term of this patent is extended or adjusted under 35 U.S.C. 154(b) by 0 days.

(21) Appl. No.: 16/643,694

(22) PCT Filed: Sep. 20, 2017

(86) PCT No.: PCT/CN2017/102468
§ 371 (c)(1),
(2) Date: Mar. 2, 2020

(87) PCT Pub. No.: WO2019/056209
PCT Pub. Date: Mar. 28, 2019

(65) Prior Publication Data
US 2020/0208048 A1    Jul. 2, 2020

(51) Int. Cl.
*C09K 11/02* (2006.01)
*G02B 26/00* (2006.01)
*G03B 21/20* (2006.01)

(52) U.S. Cl.
CPC ............ *C09K 11/02* (2013.01); *G02B 26/008* (2013.01); *G03B 21/204* (2013.01)

(58) Field of Classification Search
CPC ........... G03B 21/204; G03B 21/00–64; G03B 33/08; F21K 9/60; F21K 9/64; F21V 1/17;
(Continued)

(56) References Cited

U.S. PATENT DOCUMENTS 4,922,991 A * 5/1990 Pitcher .................... B22C 9/103
164/132
5,082,805 A    1/1992 Ali et al.
(Continued)

FOREIGN PATENT DOCUMENTS

CN    102140690 A    8/2011
CN    102484031 A    5/2012
(Continued)

OTHER PUBLICATIONS

International Search Report from PCT/CN2017/102468 dated Jun. 27, 2018.
(Continued)

*Primary Examiner* — Bao-Luan Q Le
*Assistant Examiner* — Christopher A Lamb, II
(74) *Attorney, Agent, or Firm* — Tucker Ellis LLP

(57) ABSTRACT

A light conversion device is disclosed. The light conversion device includes a substrate and a wavelength conversion element (111). The wavelength conversion element (111) includes an inorganic binder, such as sodium silicate. Also disclosed are phosphor wheels and light engines including such phosphor wheels. Further disclosed are high-power laser projection display systems comprising a laser having a power of from about 60 W and about 300 W and a light conversion device. The use of an inorganic binder permits high thermal stability at reasonable cost.

20 Claims, 2 Drawing Sheets

(58) Field of Classification Search
CPC ..... F21V 3/08; F21V 3/12; F21V 5/10; F21V 7/26; F21V 7/30; F21V 9/30; F21V 9/32; G02B 26/008; C09K 11/02; C09K 11/08
See application file for complete search history.

(56) References Cited

U.S. PATENT DOCUMENTS

| | | | |
|---|---|---|---|
| 2002/0195922 A1 | 12/2002 | Juestel et al. | |
| 2004/0245912 A1* | 12/2004 | Thurk | H05B 33/14 313/484 |
| 2006/0216519 A1 | 9/2006 | Kimura et al. | |
| 2012/0201030 A1* | 8/2012 | Yuan | H04N 9/3114 362/293 |
| 2013/0270992 A1 | 10/2013 | Gleitsmann | |
| 2014/0022760 A1* | 1/2014 | Hartwig | G03B 33/08 362/84 |
| 2014/0211170 A1* | 7/2014 | Kitano | H04N 9/3161 353/31 |
| 2015/0188007 A1* | 7/2015 | Mochizuki | C08K 3/20 257/98 |
| 2015/0205189 A1* | 7/2015 | Nojima | H01L 33/501 353/31 |
| 2015/0221833 A1* | 8/2015 | Kuiper | C09K 11/02 313/501 |
| 2015/0276177 A1* | 10/2015 | Maeda | C09K 11/02 353/84 |
| 2015/0325760 A1 | 11/2015 | Suenaga et al. | |
| 2016/0274353 A1 | 9/2016 | Ando | |
| 2017/0168379 A1 | 6/2017 | Hashizume | |
| 2020/0048546 A1* | 2/2020 | Kanzaki | C09K 11/06 |

FOREIGN PATENT DOCUMENTS

| | | |
|---|---|---|
| CN | 102484033 A | 5/2012 |
| CN | 105353581 A | 2/2016 |
| CN | 106233475 A | 12/2016 |
| CN | 107850749 A | 3/2018 |
| CN | 109073876 A | 12/2018 |
| EP | 2804255 A1 | 11/2014 |
| JP | 2011238778 A | 11/2011 |
| JP | 2012084924 A | 4/2012 |
| JP | 2013210439 A | 10/2013 |
| JP | 2014229503 | 12/2014 |
| JP | 2015510252 A | 4/2015 |
| JP | 2016510160 A | 4/2016 |
| JP | 2016512340 A | 4/2016 |
| JP | 2016224335 | 12/2016 |
| JP | 2019510260 A | 4/2019 |
| KR | 101530605 | 6/2015 |
| WO | 2012090943 A1 | 7/2012 |
| WO | 2014017501 A1 | 1/2014 |
| WO | 2017147816 A1 | 9/2017 |

OTHER PUBLICATIONS

Appl. No. 17926129.2; examination report dated Dec. 21, 2021; 5 pages.
English translation of Office Action dated Jan. 24, 2022; Appl. No. 2020-516614; 5 pages.
Chinese Search Report dated Dec. 28, 2021 for Application Serial No. 201780095466 (2 pages).
Japanese Search Report dated Apr. 28, 2021 for Application Serial No. 2020516614 (13 pages).
Supplementary European Search Report dated Mar. 18, 2021 for Application No. 17926129 (2 pages).
Supplementary Chinese Search Report dated Jun. 7, 2022 for Application Serial No. 201780095466 (2 pages).
European Search Opinion dated Mar. 26, 2021 for Application No. 17926129 (3 pages).

* cited by examiner

PHOSPHOR WHEEL WITH INORGANIC BINDER

This application is a 371 of PCT Patent Application Serial No. PCT/CN2017/102468, filed Sep. 20, 2017.

BACKGROUND

The present disclosure relates to the projection display systems and optical light conversion devices, such as phosphor wheels, used in such systems. The present disclosure also relates generally to solid state devices and illumination provided thereby. The devices include a wavelength conversion element that uses an inorganic binder. These are used in optical devices for producing different colors of light, or light of different wavelengths.

Phosphor wheels are used in a variety of optical devices such as projection-based or other picture generation systems using Digital Light Processing (DLP) technology. The phosphor wheel comprises a hub portion, which is a cylindrical body that acts as a rotor when coupled to a motor. An optically-active radial portion, usually a metal plate or a substrate, is attached to or integrated with the hub portion. Wavelength conversion materials (phosphors) on the optically-active radial portion generate emission light of a different wavelength from incident excitation light. A blue laser lighting source is commonly used in many laser projectors.

Solid-state illumination commonly refers to light emitted by solid state electroluminescence, in contrast to thermal radiation (e.g. incandescent light) or fluorescence. Solid-state lights commonly produce blue light. However, other colors can be useful/desired.

Wavelength conversion materials such as phosphors are typically provided in one of two ways. First, in a phosphor-in-silicone product, the phosphor powder is mixed into a silicone binder or adhesive, then dispensed or printed in the desired pattern. A silicon binder is popular due to its high transparency, high bonding strength, lower refractive index, and proper viscosity. For example, a popular binder choice is Dow Corning® 0E-6336, a silicone adhesive manufactured by Dow Corning®, which has a mixed viscosity of 1,425 centipoise (cP), a transparency of 99.6% at 450 nm and 1 mm thickness, a refractive index of 1.4, and a heat curing time of 60 minutes at 150° C.

However, silicone binders/adhesives have poor thermal stability. At temperatures over 200° C., silicone adhesives will degrade, typically begin to turn yellow, and gradually begin to burn. This undesirably leads to a short service lifetime for the phosphor wheel, and the light conversion efficiency has been observed to drop sharply (>10% @ 200° C.) due to thermal quenching. It has also been found that in phosphor wheels at temperatures of more than 195° C., the phosphor-in-silicone layer cracks after about 1,000 hours. At reduced temperatures of about 185° C., phosphor performance was found to exhibit only a 10% decrease after 20,000 hours, without any cracking. In applications with high brightness (e.g., laser power up to 300 W), the temperature of the phosphor wheel is expected to be generally more than 200° C., thus making the use of silicon adhesive undesirable. That is, the phosphor-in-silicone product cannot achieve a long operational life in high-power laser projectors. In lifetime tests for such a product, it was established that the safe working temperature should be controlled under 150° C. Thus, the use of an organic binder (e.g., silicone) on top of or as a reflective layer for an optical light conversion device, such as a phosphor wheel, is undesirable due to the upper temperature limitations of such organic binders.

Second, in a phosphor-in-ceramic product, a phosphor is mixed with a ceramic binder and sintered to make a solid phosphor-in-ceramic product. A phosphor-in-ceramic product has good operating temperatures up to 300° C. However, the sintering temperature is well over 1000° C. and as a result such products are also very high cost.

It would therefore be desirable to provide light conversion device that are suitable for use in high-power, high-temperature sources (e.g., high-power laser projection systems) without significant reduction in efficiency or working lifetime and without any other significant parameter or performance changes.

BRIEF DESCRIPTION

The present disclosure relates to optical light conversion devices that are suitable for use in high-power, high-temperature sources. Briefly, an inorganic binder is used with a phosphor to make a wavelength conversion element. In particular embodiments, the inorganic binder is a sodium silicate, which is capable of withstanding the high operating temperatures of high-power lighting systems (e.g., in excess of 200° C.).

In particular embodiments, the wavelength conversion element comprises an inorganic binder and a phosphor (usually in the form of a powder). The substrate can be an annular disc. The annular disc can made from a reflective material, such as a metallic material, or can be made for a non-metallic material or a composite material having a reflective coating. For example, the reflective material/reflective coating can be made from a metallic material, a dielectric material, or a combination thereof.

The inorganic binder can be a sodium silicate. The ratio of $SiO_2$:$Na_2O$ in the sodium silicate may be from about 2:1 to about 3.75:1. The weight ratio of the phosphor to the inorganic binder in the wavelength conversion element may be from about 1:1 to about 5:1.

The inorganic binder can be substantially optically transparent (e.g., the inorganic binder can have a light transmittance of at least 80%, including 90% and up to 98%). The inorganic binder can be capable of withstanding temperatures greater than 200° C. The inorganic binder can have an initial bonding strength of at least 100 psi (or higher) before aging. The bonding strength will gradually drop during high temperature aging. After aging, the bonding strength should be more than 20 psi. The inorganic binder can have a curing temperature of from about 100° C. to about 500° C. The inorganic binder can have a viscosity of from about 0 centipoise (cP) to about 2000 cP. The wavelength conversion element may have a thickness of about 0.05 millimeters (mm) to about 0.3 mm.

The light conversion devices may be used in a phosphor wheel, light engine, automotive headlight, or other illumination device. The phosphor wheel may be rotatable around an axis normal to a planar surface of the substrate. In this case, the assembly may further include a motor that rotates the substrate around this axis. The light engine may also include a light source (e.g., laser-based illumination source) arranged to apply the light of the excitation wavelength to the wavelength conversion element.

Also disclosed in various embodiments herein are methods for making a phosphor wheel, the methods comprising applying a wavelength conversion element comprising an inorganic binder and a phosphor to a substrate.

The inorganic binder can, in certain embodiments, be applied to the substrate by dispensing, spraying, brushing, or silk printing. The inorganic binder can be cured by thermal curing or hybrid curing (thermal and UV curing). The inorganic binder can be cured at a temperature of from about 100° C. to about 500° C., and can be capable of withstanding temperatures greater than 200° C.

Further disclosed in various embodiments herein are laser projection display systems, comprising: a laser having a power of from about 60 W and about 300 W; and a phosphor wheel comprising: an optional substrate; and a wavelength conversion element configured to absorb light of an excitation wavelength and generate light of an emission wavelength, and comprising an inorganic binder and a phosphor. The inorganic binder can be capable of withstanding temperatures greater than 200° C.

These and other non-limiting characteristics of the disclosure are more particularly disclosed below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1A:
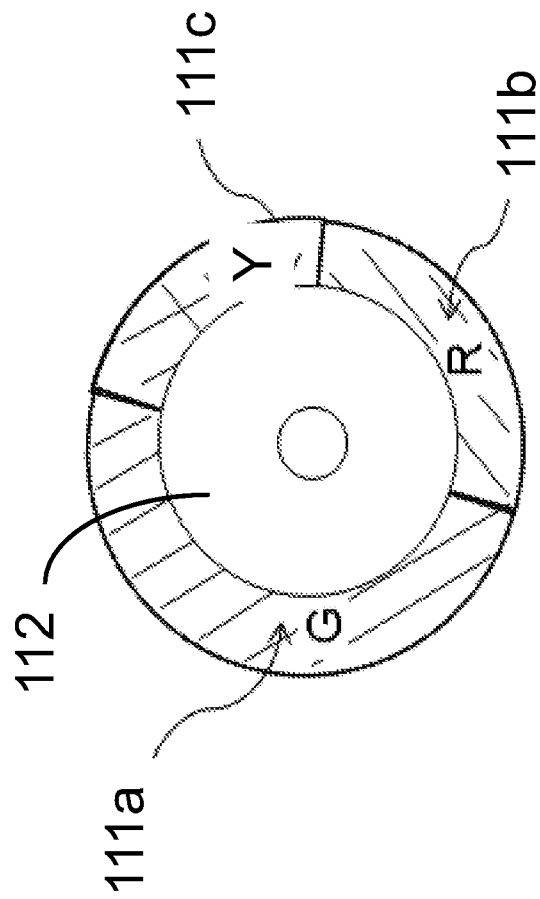
FIG. 1A is a plan view of a conventional reflective phosphor wheel.

A more complete understanding of the components, processes and apparatuses disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification and in the claims, the terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any unavoidable impurities that might result therefrom, and excludes other ingredients/steps.

Numerical values in the specification and claims of this application should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values).

The terms "about" and "approximately" can be used to include any numerical value that can vary without changing the basic function of that value. When used with a range, "about" and "approximately" also disclose the range defined by the absolute values of the two endpoints, e.g. "about 2 to about 4" also discloses the range "from 2 to 4." Generally, the terms "about" and "approximately" may refer to plus or minus 10% of the indicated number.

As used herein, the terms "excitation light" and "excitation wavelength" refer to input light which is subsequently converted, e.g. light produced by a laser-based illumination source or other light source. The terms "emission light" and "emission wavelength" refer to the converted light, e.g. the resulting light produced by a phosphor which has been exposed to excitation light.

For reference, the color red usually refers to light having a wavelength of about 780 nanometers to about 622 nanometers. The color green usually refers to light having a wavelength of about 577 nanometers to about 492 nanometers. The color blue usually refers to light having a wavelength of about 492 nanometers to about 455 nanometers. The color yellow usually refers to light having a wavelength of about 597 nanometers to about 577 nanometers. However, this may depend on the context. For example, these colors are sometimes used to label various parts and distinguish those parts from each other.

The present disclosure relates to light conversion devices, such as phosphor wheels, which use an inorganic binder that provides thermal properties which are better than silicone binder, but which are significantly lower in cost than ceramic binder.

A phosphor wheel is used to generate light of different colors sequentially. Light conversion (or wavelength conversion) materials such as phosphors are used on the phosphor wheel. The phosphor wheel normally has some fan segments which contain different types of phosphor to convert the excitation light to a green, yellow, or red color. Typically, a blue light laser (having a wavelength of about 440 nm to about 460 nm) is used to excite the phosphor segments on the phosphor wheel. The phosphor wheel can also have one or more gaps to pass the blue source light through unconverted. Phosphor wheels have two basic structures: reflective and transmissive.

Figure 1B:
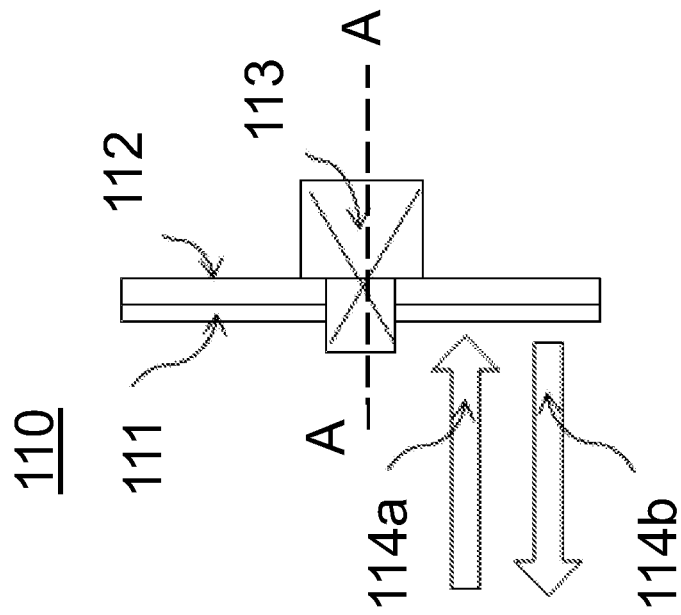
FIG. 1B is a side view showing the optical path therethrough.

In a reflective phosphor wheel, the excitation light of the blue light laser does not pass through the substrate before stimulating the phosphors. FIG. 1A and FIG. 1B show the typical structure of a reflective phosphor wheel. Phosphor powder is mixed with a binder to make a phosphor mixture that is deposited on a substrate 112. In some embodiments, the substrate is optional.

The substrate of a phosphor wheel, when present, is typically a metal having a high thermal conductivity, e.g. aluminum or an aluminum alloy, copper or a copper alloy, or another metal having a high thermal conductivity. The substrate could also, for example, be made of glass, sapphire, or diamond. The substrate can, when desired, include a mirrored or reflective coating or can be made from a reflective material. For example, the reflective material/ reflective coating can be made from a metallic material, a dielectric material, or a combination thereof. Examples of metallic materials include the metals and metal alloys previously identified. Examples of dielectric materials include magnesium fluoride, silicon dioxide, tantalum pentoxide, zinc sulfide, and titanium dioxide.

After curing at a specified or desired temperature, the phosphor mixture is in the form of a wavelength conversion element 111 that is tightly bonded to the substrate. As illustrated in FIG. 1A, there are three wavelength conversion elements: a green segment 111a, a red segment 111b, and a yellow segment 111c. These three segments are located on the perimeter of the circular (from the plan view) substrate 112. Not shown here is a segment for the blue excitation light, which passes through the substrate and is not reflected. As illustrated in FIG. 1B, the substrate 112 is then mounted to the motor 113 to obtain a phosphor wheel 110. In a phosphor wheel, the substrate is rotated during use. It is also contemplated that the substrate may be used in a static (i.e. fixed, non-rotating) configuration. For example, the wavelength conversion element can be bonded directly to a substrate that acts as a heat sink.

As illustrated in FIG. 1B, as the substrate 112 is rotated about axis A-A, excitation blue light 114a stimulates the red and green phosphors 111, and the emission light 114b is reflected by the substrate 112 and then collected by the subsequent optical system. In this way, the excitation light does not pass through the substrate 112 to stimulate the phosphors to obtain the emitted light.

Figures 2A, 2B:
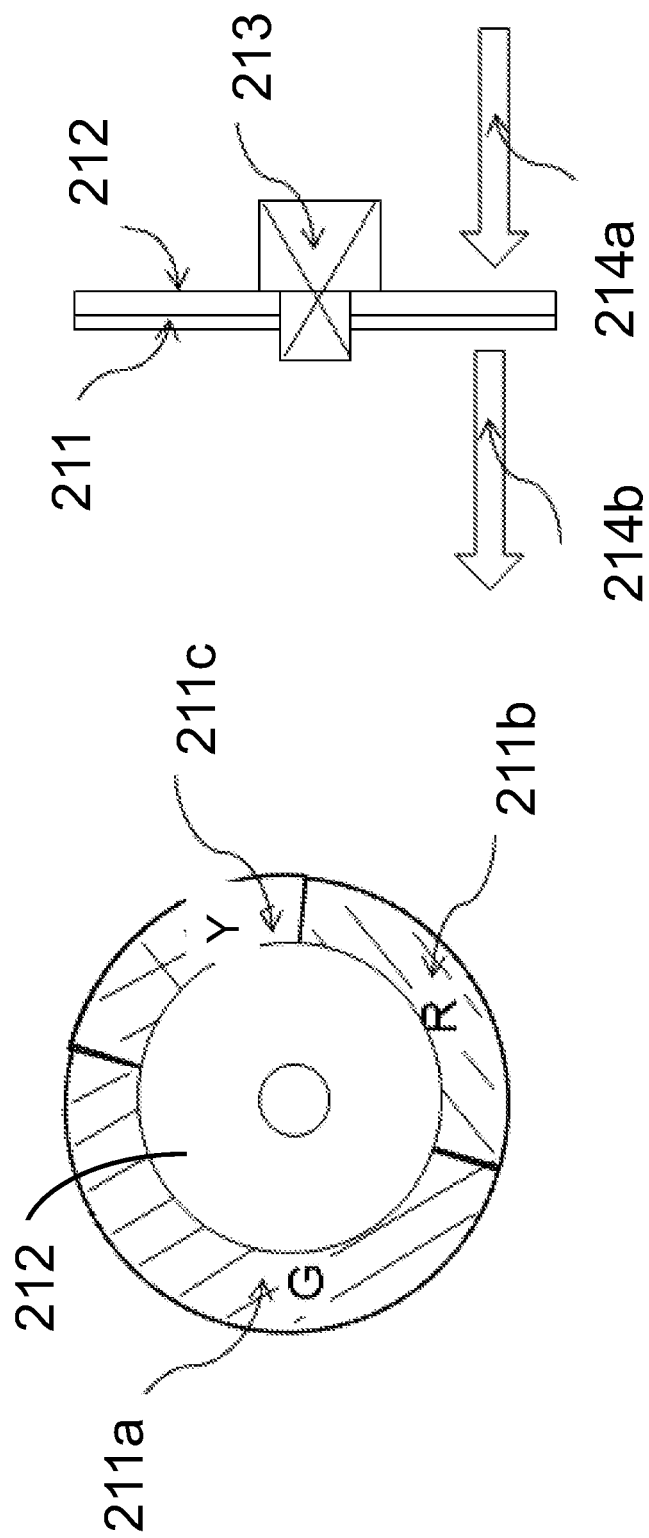
FIG. 2A is a plan view of a conventional transmissive phosphor wheel.
FIG. 2B is a side view showing the optical path therethrough.

The second type of phosphor wheel is a transmissive phosphor wheel. In a transmissive phosphor wheel, the excitation light passes through the substrate before stimulating the phosphors. FIG. 2A and FIG. 22B show the typical transmissive phosphor wheel structure. Again, three wavelength conversion elements 211 are illustrated here: a green segment 211a, a red segment 211b, and a yellow segment 211c. Instead of a reflective substrate, though, in a transmissive phosphor wheel the entire substrate 212 is a transparent substrate that is coated with a blue dichroic film. Generally, glass, diamond, or sapphire is used as the substrate material. Blue light can pass through the substrate, while the red, green, and yellow (RGY) light emitted by the phosphor is reflected.

As illustrated in FIG. 2B, excitation blue light 214a first passes through the substrate (i.e. is transmitted from the backside of the phosphor wheel) and then stimulates the phosphors 211. The emission light 214b is collected by the subsequent optical system.

Some performance characteristics such as conversion light output, color, and lifetime are direct functions of working temperature. At higher operating temperatures, the conversion light output may decrease, the color may shift, and the lifetime of the phosphor wheel may be decreased. Under normal operating conditions, approximately 50%-60% of the input power is output as heat, while the rest of the input power is converted to light. At high input powers, heat generation during the conversion will cause high temperatures of more than 200 degrees Celsius (200° C.).

A desirable binder for phosphors to make the wavelength conversion element should ideally have a combination of several properties. The binder should have high transparency at visible wavelengths; a low refractive index; high bonding strength; high thermal stability (i.e. a high Tg or maximum operating temperature); a relatively low curing/sintering temperature; good compatibility/miscibility with the phosphor; and/or desirable viscosity. This will enhance the thermal endurance of a phosphor wheel at temperatures from 165° C. to 300° C.

In the present disclosure, the wavelength conversion element, such as the phosphor segment of a phosphor wheel, comprises a phosphor and an inorganic binder. The term "inorganic" means the binder does not contain any carbon.

The wavelength conversion element can also include one or more fillers, one or more inorganic materials, and one or more dispersants.

The addition of the filler(s) to the inorganic material(s) enhances the bonding strength of the inorganic binder. In particular, the addition of the filler(s) can reduce the shrinkage rate of the composition used to make the wavelength conversion element, reducing or preventing the formation of bubbles or cracks during solidification, thereby decreasing the amount and/or effect of stress during use and improving the bonding strength of the composition. The filler(s) can be chosen to have a thermal expansion coefficient that is as close as possible (e.g., substantially equivalent to) the thermal expansion coefficient of the inorganic material(s). Similarly, to avoid stratification, the filler(s) can be chosen to have a density that is as close as possible (e.g., substantially equivalent to) the density of the inorganic material(s). The filler(s) may have any desired shape, such as a granular, flaky, or fibrous shape. Any suitable filler(s) can be used. For example, it is specifically contemplated that that the filler(s) could be silica, a silicate, an aluminate, or a phosphate, or diamond powder. The filler could be a metal powder, such as aluminum, copper, silver, or gold powder. The filler could be a nitride, such as aluminum nitride or borazon. The filler could be an oxide, such as aluminum oxide or boron oxide. The filler could be a metallic oxide, metal nitride, or metal sulfide.

The addition of the dispersant(s) is beneficial to disperse the filler(s) throughout the binder, thereby avoiding undesirable aggregation or sedimentation. Any suitable dispersant(s) can be used. For example, it is specifically contemplated that the dispersant(s) could be an organic dispersant, such as polyvinylpyrrolidone, polyacrylate, gelatin, polyvinyl alcohol, cellulose, styrene-co-maleic anhydride, or lignosulfate. It is specifically contemplated that, alternatively, the dispersant(s) could be an inorganic dispersant, such as hexametaphosphate, silicate, polyphosphate, or fumed silica.

Desirably, the inorganic binder has a coefficient of thermal expansion (CTE) of about 0.5 to about 25 ppm/° C. In particular embodiments, the inorganic binder is sodium silicate. Sodium silicate is the common name for compounds of the formula $(Na_2SiO_3)_n$, and can alternatively be considered a polymer, as seen below in Formula (I).

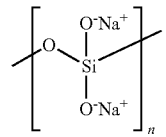

Formula (I)

Sodium silicate has both an anhydrous form and a hydrated form $Na_2SiO_3 \cdot nH_2O$, where n=5, 6, 8, or 9. Sodium silicate can be characterized by the weight ratio of silicon dioxide ($SiO_2$) to sodium oxide ($Na_2O$). The weight ratio of $SiO_2:Na_2O$ may vary from 2:1 to 3.75:1. In particular embodiments, the weight ratio of $SiO_2:Na_2O$ is from about 2.5:1 to about 3.75:1, or about 2:1 to about 3:1. Sodium silicate is typically provided as an aqueous solution.

In other embodiments, the inorganic binder can be made from other inorganic materials besides sodium silicate. Those inorganic materials can be silicates, aluminates, phosphates, borates, or inorganic sol-gels. Examples of inorganic sol-gels include sol-gels made from silicon dioxide ($SiO_2$) or aluminum oxide ($Al_2O_3$).

The phosphor and the inorganic binder are typically mixed together to form a paste which is then applied to the substrate in the desired area. The weight ratio of the phosphor to the inorganic binder is from about 1:1 to about 5:1, i.e. there can be more phosphor than inorganic binder, including from about 1:1 to about 3:1 and from about 1:1 to about 2:1.

The application of the paste can then be performed, for example, by dispensing, spraying, brushing, or silk printing of the paste. In applications where the paste is to be applied by dispensing or silk printing, the paste should have a suitable viscosity of from about 0 to about 5,000 centipoise (cP), including from about 0 to about 2,000 cP, or from about 100 cP to about 2,000 cP), of from about 0 to about 2,500 cP, or from about 100 cP to about 2,500 cP. The viscosity is measured using a Brookfield DVE SLVTJO viscometer, or according to ASTM D1084. The inorganic binder by itself (i.e. no phosphor) can also have a suitable viscosity of from about 0 to about 5,000 centipoise (cP), including from about 0 to about 2,000 cP, or from about 100 cP to about 800 cP.

The paste is then cured to obtain the wavelength conversion element. The curing can be performed by thermal curing at a temperature of from about 100° C. to about 500° C., which is lower than for conventional silicone adhesives.

The resulting wavelength conversion element typically can have a thickness of about 0.05 mm to about 0.3 mm. The thickness is measured in the direction of axis A-A in FIG. 1A.

Desirably, the inorganic binder is substantially optically transparent (e.g., the inorganic binder has a light transmittance of at least 80%, including 90% and up to 98%. This is measured, for example, by using a Lambda 950 spectrophotometer available from Perkin-Elmer at a thickness of about 0.1 to about 0.2 millimeters. In contrast, many inorganic binders are opaque. This permits the inorganic binder to be used in a transmissive or reflective phosphor wheel.

In particular embodiments, the inorganic binder can be applied to a reflective layer or coating applied to the substrate. The reflective layer has been previously discussed, and can be made from a metallic material, a dielectric material, or a combination thereof. Dielectric mirrors are known in the art. When the reflective layer is a metallic material, it is usually made from a metal that is different from the metal used to make the substrate.

In further embodiments, a smoothing layer can be applied upon the wavelength conversion element. The smoothing layer serves the function of reducing the surface roughness of the final device, without the use of mechanical processes such as polishing which can damage the final device. This reduces scatter, improving the efficiency of the wavelength conversion and improving the ability to direct the resulting light in desired directions. The smoothing layer can be polymeric, or can be made of materials such as metals like tungsten, nickel, or cobalt; or a carbide such as boron carbide or silicon carbide.

Additional top coatings can be applied to the device as well. Such coatings can be transparent, anti-reflective, or spectrally selective coatings, as desired for various applications.

It is contemplated that any combination of such layers/coatings may be present. For example, a phosphor wheel according to the present disclosure can be designed with a substrate, a reflective coating applied to the substrate, the wavelength conversion element applied upon the reflective coating, a smoothing layer applied on top of the inorganic binder, and a top coating applied upon the smoothing layer.

The inorganic binder, particularly sodium silicate, can exhibit a greater bonding strength than conventional silicone adhesives. In particular embodiments, the inorganic binder of the present disclosure can have an initial bonding strength of at least 100 psi, or at least 200 psi, or from about 100 psi to about 600 psi. This property is measured using two aluminum test plates with the inorganic binder placed between the two plates at a thickness of 0.1 mm and a bonding area of 169 square mm, at the maximum temperature at which the adhesive is applied, for example at 300° C.

It has been found that inorganic materials are usually long-term stable and therefore performance of these devices does not necessarily degrade significantly over time. Moreover, organic materials can exhibit some outgassing at high working temperatures. This may result in contamination of nearby components in an optical device. Additionally, inorganic binders may be more durable than traditional silicone materials in high power conditions. They exhibit reliable operation under high laser irradiance and temperature. They can also be flexibly made into various sizes, shapes, and thicknesses. The inorganic binders of the present disclosure are also capable of withstanding high working temperatures, namely working temperatures in excess of 200° C. They can be used in high-power laser projection display systems where the solid-state laser projector can be equipped with laser power from about 60 watts to about 300 watts, including in excess of 100 watts. The working temperature of such devices can reach above 200° C. to enable high luminous brightness.

It is contemplated that the inorganic binders can be used in phosphor wheels and in laser projection display systems. They can also be used in conjunction with a solid-state illumination source, for example in automotive headlights.

The following examples are provided to illustrate the processes of the present disclosure. The examples are merely illustrative and are not necessarily intended to limit the disclosure to the materials, conditions, or process parameters set forth therein.

EXAMPLES

Example 1

Sodium silicate was used as the inorganic binder with a phosphor in a phosphor wheel. The inorganic binder had a weight ratio of $SiO_2:Na_2O$ of 2.5:1. The inorganic binder alone (i.e. pure) had a viscosity of 600 cP. The viscosity of the paste formed by combining the inorganic binder with the phosphor was 2000 cP. The paste had an initial bonding strength of 500 psi. The paste was then cured for four hours at 200° C. The phosphor wheel was then tested. The phosphor segment was thermally stable up to 300° C., and had a light transmittance of 98%.

The emission light efficiency of this phosphor wheel using sodium silicate as an inorganic binder was compared to a phosphor wheel using an organic silicone binder (i.e. comparative example). The new phosphor wheel had an efficiency that was only 3% less than that of the comparative example.

Example 2

A silicate was used as the inorganic binder with a phosphor in a phosphor wheel. The inorganic binder alone (i.e. pure) had a viscosity of 200 cP. The viscosity of the paste formed by combining the inorganic binder with the phosphor was 1500 cP. The paste had an initial bonding strength of 200 psi. The paste was then cured for 0.3 hours at 85° C. and then 0.75 hours at 185° C. The phosphor wheel was then tested. The phosphor segment was thermally stable up to 400° C., and had a light transmittance of 98%. The emission light efficiency of this new phosphor wheel was only 4% less than that of the comparative example.

Example 3

In one exemplary embodiment, the inorganic material used in the inorganic binder was formed from first and second components. The total dissolved solids (TDS) characteristics of the inorganic material used is provided in the following table:

| Designation | Appearance | Viscosity (mPa · sec) | Density (g/cm$^3$) | Solids Content |
|---|---|---|---|---|
| First Component | Semitransparent liquid | 1~50 | 0.8~1.3 | >10% |
| Second Component | Transparent liquid | 0~50 | 0.6~1.0 | >10% |

The inorganic material was prepared by mixing the first component and the second component and stirring for a period of about 2 to about 3 hours at a temperature of from about 25 to about 30° C. The ratio of the first component to the second component was from about 1:1 to about 7:3.

The inorganic binder was then prepared by adding filler(s) and dispersant(s) to the inorganic material. The inorganic binder was cured in a step-by-step process. The first curing step was performed at a temperature of from about 60 to about 90° C. for a period of from about 0.2 to about 1 hour. The second curing step was subsequently performed at a temperature of from about 150 to about 200° C. for a period of from about 0.4 to about 2 hours. The cured inorganic binder was shown to exhibit excellent bonding strength at max applied temperature due to the high temperature resistance of the inorganic binder.

The present disclosure has been described with reference to exemplary embodiments. Modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A light conversion device, comprising:
   a wavelength conversion element configured to absorb light of an excitation wavelength and generate light of an emission wavelength, the wavelength conversion element comprising an inorganic binder, a dispersant, a filler, and a phosphor, wherein the filler has a thermal expansion coefficient that is substantially equivalent to a thermal expansion coefficient of the inorganic binder, and wherein the filler has a density that is substantially equivalent to a density of the inorganic binder.

2. The light conversion device of claim 1, wherein the inorganic binder comprises sodium silicate.

3. The light conversion device of claim 1, wherein the inorganic binder comprises an inorganic material selected from the group consisting of silicates, aluminates, phosphates, borates, and inorganic sol-gels.

4. The light conversion device of claim 1, wherein a weight ratio of the phosphor to the inorganic binder is from about 1:1 to about 5:1.

5. The light conversion device of claim 1, wherein the inorganic binder is substantially optically transparent and has a light transmittance of at least 80%.

6. The light conversion device of claim 1, wherein the inorganic binder is capable of withstanding temperatures greater than 200° C., and wherein the inorganic binder has a bonding strength of at least 100 psi.

7. The light conversion device of claim 1, wherein the inorganic binder has a curing temperature of from about 100° C. to about 500° C.

8. The light conversion device of claim 1, wherein the inorganic binder has a viscosity of from about 0 cP to about 2,000 cP.

9. The light conversion device of claim 1, wherein the wavelength conversion element has a thickness of about 0.05 mm to about 0.3 mm.

10. The light conversion device of claim 1, further comprising a substrate upon which the wavelength conversion element is mounted, wherein the substrate is in the shape of a disk, and further comprising a motor arranged to rotate the substrate around an axis normal to the substrate.

11. A light engine, comprising:
    the light conversion device of claim 1; and
    a light source arranged to expose the light conversion device to light of the excitation wavelength.

12. The light conversion device of claim 1, wherein the thermal expansion coefficient of the inorganic binder is about 0.5 to about 25 ppm/° C.

13. A method for making a phosphor wheel, comprising:
    forming a paste by mixing a phosphor, a dispersant, a filler, and an inorganic binder together to form the paste; and
    applying the paste to a substrate to create a wavelength conversion element that comprises the inorganic binder, the dispersant, the filler, and the phosphor, wherein the filler has a thermal expansion coefficient that is substantially equivalent to a thermal expansion coefficient of the inorganic binder, and wherein the filler has a density that is substantially equivalent to a density of the inorganic binder.

14. The method of claim 13, wherein the wavelength conversion element is applied to the substrate by dispensing, spraying, brushing, or silk printing.

15. The method of claim 13, further comprising curing the inorganic binder.

16. The method of claim 15, wherein the inorganic binder is cured at a temperature of from about 100° C. to about 500° C., wherein the inorganic binder has a bonding strength of at least 100 psi.

17. The method of claim 13, wherein the inorganic binder comprises an inorganic material selected from the group consisting of silicates, aluminates, phosphates, borates, and inorganic sol-gels.

18. The method of claim 13, wherein the thermal expansion coefficient of the inorganic binder is about 0.5 to about 25 ppm/° C.

19. A laser projection display system, comprising:
    a laser light having a power of from about 60 W and about 300 W; and a phosphor wheel comprising:
  a substrate; and
  a wavelength conversion element configured to absorb light of an excitation wavelength and generate light of an emission wavelength, the wavelength conversion element comprising an inorganic binder, a dispersant, a filler, and a phosphor, wherein the filler has a thermal expansion coefficient that is substantially equivalent to a thermal expansion coefficient of the inorganic binder, and wherein the filler has a density that is substantially equivalent to a density of the inorganic binder.

20. The system of claim 19, wherein the thermal expansion coefficient of the inorganic binder is about 0.5 to about 25 ppm/° C.

* * * * *